(12) United States Patent
Iwatsuka et al.

(10) Patent No.: US 11,226,531 B2
(45) Date of Patent: Jan. 18, 2022

(54) OPTICAL MODULATOR

(71) Applicant: TDK Corporation, Tokyo (JP)

(72) Inventors: Shinji Iwatsuka, Tokyo (JP); Makoto Endo, Tokyo (JP); Kenji Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/641,225

(22) PCT Filed: Jul. 31, 2018

(86) PCT No.: PCT/JP2018/028648
§ 371 (c)(1),
(2) Date: Feb. 21, 2020

(87) PCT Pub. No.: WO2019/039215
PCT Pub. Date: Feb. 28, 2019

(65) Prior Publication Data
US 2020/0218126 A1    Jul. 9, 2020

(30) Foreign Application Priority Data

Aug. 24, 2017    (JP) .............................. JP2017-160910

(51) Int. Cl.
*G02F 1/225*    (2006.01)
*G02F 1/03*    (2006.01)
(Continued)

(52) U.S. Cl.
CPC .............. *G02F 1/225* (2013.01); *G02F 1/035* (2013.01); *G02F 1/0316* (2013.01); *G02F 1/212* (2021.01);
(Continued)

(58) Field of Classification Search
CPC ......... G02F 1/225; G02F 1/0316; G02F 1/035
(Continued)

(56) References Cited

U.S. PATENT DOCUMENTS 5,129,017 A  *  7/1992  Kawano ............... G02F 1/0356
                                                      385/2
5,790,719 A  *  8/1998  Mitomi ................ G02F 1/2255
                                                      385/2
(Continued)

FOREIGN PATENT DOCUMENTS

JP    H01-091111 A    4/1989
JP    H05-158003 A    6/1993
(Continued)

OTHER PUBLICATIONS

International Search Report issued in corresponding International Patent Application No. PCT/JP2018028648, dated Oct. 23, 2018, with English translation.

*Primary Examiner* — Kaveh C Kianni
(74) *Attorney, Agent, or Firm* — McDermott Will & Emery LLP

(57) ABSTRACT

An optical modulator includes: first and second optical waveguides formed of an electro-optic material film on a substrate so as to have a ridge shape and to be disposed adjacent to each other; a buffer layer covering at least the upper surfaces of the first and second optical waveguides; and first and second signal electrodes provided above the buffer layer. The first and second signal electrodes have, respectively, first and second lower layer parts opposite, respectively, to the first and second optical waveguides through the buffer layer; and first and second upper layer parts provided, respectively, above the first and second lower layer parts. Widths of the lower surfaces of the first and second lower layer parts are smaller than widths of the first and second upper layer parts.

9 Claims, 12 Drawing Sheets

(51) Int. Cl.
   *G02F 1/035* (2006.01)
   *G02F 1/21* (2006.01)
(52) U.S. Cl.
   CPC ...... *G02F 2201/50* (2013.01); *G02F 2202/20* (2013.01)
(58) Field of Classification Search
   USPC .................................................. 385/2
   See application file for complete search history.

(56) References Cited

U.S. PATENT DOCUMENTS

| | | | | |
|---|---|---|---|---|
| 6,069,729 | A * | 5/2000 | Gill | G02F 1/035 359/245 |
| 6,310,700 | B1 * | 10/2001 | Betts | B82Y 10/00 359/2 |
| 6,356,673 | B1 * | 3/2002 | Burns | G02F 1/2255 385/1 |
| 9,244,296 | B2 * | 1/2016 | Iwatsuka | G02F 1/0316 |
| 9,664,931 | B1 * | 5/2017 | Yap | G02F 1/225 |
| 2002/0146190 | A1 * | 10/2002 | Doi | H04B 10/505 385/14 |
| 2004/0184755 | A1 | 9/2004 | Sugiyama et al. | |
| 2005/0175271 | A1 | 8/2005 | Sugiyama et al. | |
| 2005/0201686 | A1 * | 9/2005 | Cole | G02F 1/2255 385/40 |
| 2005/0271313 | A1 * | 12/2005 | Oikawa | G02F 1/035 385/3 |
| 2006/0029319 | A1 * | 2/2006 | Sugiyama | G02F 1/2255 385/1 |
| 2006/0228065 | A1 * | 10/2006 | Burns | G02F 1/2255 385/3 |
| 2008/0002992 | A1 * | 1/2008 | Hochberg | G02F 1/365 398/200 |
| 2008/0069491 | A1 * | 3/2008 | Kissa | G02F 1/2255 385/2 |
| 2008/0089633 | A1 * | 4/2008 | Moeller | G02F 1/0356 385/2 |
| 2008/0170821 | A1 * | 7/2008 | Kissa | G02F 1/0316 385/14 |
| 2009/0297087 | A1 * | 12/2009 | Kawano | G02F 1/2255 385/2 |
| 2010/0002994 | A1 * | 1/2010 | Baehr-Jones | G02B 6/1223 385/32 |
| 2010/0310206 | A1 * | 12/2010 | Kawano | G02F 1/0356 385/2 |
| 2010/0329600 | A1 * | 12/2010 | Sugiyama | G02B 6/29352 385/2 |
| 2012/0087616 | A1 * | 4/2012 | Ichioka | G02F 1/3137 385/2 |
| 2012/0099812 | A1 * | 4/2012 | Kissa | G02F 1/2255 385/2 |
| 2015/0078701 | A1 * | 3/2015 | Takemura | G02F 1/035 385/2 |
| 2015/0138619 | A1 | 5/2015 | Iwatsuka et al. | |
| 2019/0146302 | A1 | 5/2019 | Iwatsuka et al. | |
| 2019/0271897 | A1 | 9/2019 | Iwatsuka et al. | |

FOREIGN PATENT DOCUMENTS

| | | |
|---|---|---|
| JP | H05-173099 A | 7/1993 |
| JP | H06-235891 A | 8/1994 |
| JP | H09-297289 A | 11/1997 |
| JP | H10-039266 A | 2/1998 |
| JP | 2004-287093 A | 10/2004 |
| JP | 2006-195383 A | 7/2006 |
| JP | 4485218 B2 | 6/2010 |
| JP | 2014-006348 A | 1/2014 |
| JP | 2014-142411 A | 8/2014 |
| JP | 2015-118371 A | 6/2015 |
| JP | 2017-129834 A | 7/2017 |
| JP | WO2017/183484 A1 | 2/2019 |

* cited by examiner

OPTICAL MODULATOR

CROSS-REFERENCE TO RELATED APPLICATIONS

This application is the U.S. National Phase under 35 U.S.C. § 371 of International Patent Application No. PCT/JP2018/028648, filed on Jul. 31, 2018, which in turn claims the benefit of Japanese Patent Application No. 2017-160910, filed on Aug. 24, 2017, the entire disclosures of which Applications are incorporated by reference herein.

TECHNICAL FIELD

The present invention relates to an optical modulator used in the fields of optical communication and optical measurement and, more particularly, to an electrode structure of a Mach-Zehnder optical modulator.

BACKGROUND ART

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As the optical modulator, a Mach-Zehnder optical modulator in which an optical waveguide is formed by Ti (titanium) diffusion in the vicinity of the surface of a lithium niobate single-crystal substrate has been put to practical use (see, e.g., Patent Document 1). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

On the other hand, Patent Documents 2 and 3 disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

The cross-sectional structure of a conventional optical modulator 700 described in Patent Document 2 is illustrated in FIG. 12A. A pair of optical waveguides 22a and 22b of a lithium niobate film are formed on a sapphire substrate 21, and a signal electrode 24a and a ground electrode 24b are disposed above the optical waveguides 22a and 22b, respectively, through a buffer layer 23. The optical modulator 700 is of a so-called single drive type having one signal electrode 24a, and the signal electrode 24a and ground electrode 24b have a symmetrical structure, so that electric fields to be applied to the optical waveguides 22a and 22b are the same in magnitude and opposite in polarity, preventing the wavelength chirp of a modulated light from occurring. However, the area of the ground electrode 24b is small, preventing operation at high frequencies.

The cross-sectional structure of a conventional optical modulator 800 described in Patent Document 3 is illustrated in FIG. 12B. Two signal electrodes $24a_1$ and $24a_2$ are disposed above a pair of optical waveguides 22a and 22b of a lithium niobate film, respectively, through a buffer layer 23, and three ground electrodes 24c, 24d and 24e are disposed so as to be separated from the signal electrodes $24a_1$ and $24a_2$. When voltages same in magnitude and opposite in polarity are applied to the two signal electrodes $24a_1$ and $24a_2$, respectively, electric fields to be applied to the optical waveguides 22a and 22b become the same in magnitude and opposite in polarity, preventing the wavelength chirp of a modulated light from occurring. Further, the amount of the chirp can be adjusted by adjusting voltage to be applied to the pair of optical waveguides 22a and 22b. Furthermore, a sufficient area is ensured for the left and right ground electrodes 24c and 24d, allowing operation at high frequencies. However, the optical modulator 800 is of a dual drive type having two signal electrodes $24a_1$ and $24a_2$, complicating an electrode structure.

CITATION LIST

Patent Document

[Patent Document 1] Japanese Patent No. 4,485,218
[Patent Document 2] JP 2006-195383A
[Patent Document 3] JP 2014-6348A

SUMMARY OF INVENTION

Problem to be Solved by Invention

In optical modulators, wider bandwidth of equal to or more than 35 GHz is required for higher transmission speed from a current 32 Gbaud to 64 Gbaud. In order to achieve such wider bandwidth, the following three points are important: (1) Reduction in electrode loss at high frequencies; (2) Velocity matching between light and microwave; and (3) Impedance matching. Among them, (1) is particularly important. This is because, at high frequencies, current only flows in the vicinity of the electrode surface due to skin effect to result in an increase in electrode loss.

In order to reduce electrode loss in the conventional optical modulator illustrated in FIG. 12B, it is effective to increase the cross-sectional area of the signal electrode. To this end, it is necessary to increase the thicknesses T or widths W of the signal electrodes $24a_1$ and $24a_2$.

However, increasing the thicknesses T of the signal electrodes $24a_1$ and $24a_2$ may reduce the effective dielectric constant of microwave to prevent velocity matching and may lower impedance to prevent impedance matching. Further, increasing the widths W of the signal electrodes $24a_1$ and $24a_2$ may deteriorate efficiency of the electric field to be applied to the optical waveguide and increase in half-wavelength voltage although the effective dielectric constant and impedance do not change significantly. Therefore, in a conventional electrode structure, it is difficult to achieve wider bandwidth of equal to or more than 35 GHz supporting high-speed transmission of 64 Gbaud.

It is therefore an object of the present invention to provide a dual drive type optical modulator having low electrode loss, having satisfactory high-frequency characteristics, and capable of being driven with a low voltage due to improvement in efficiency of the electric field to be applied to the optical waveguide.

Means for Solving the Problem

An optical modulator according to the present invention includes: a substrate; first and second optical waveguides formed of an electro-optic material film on the substrate so as to have a ridge shape and to be disposed adjacent to each other; a buffer layer covering at least upper surfaces of the first and second optical waveguides; and first and second signal electrodes provided above the buffer layer. The first signal electrode has a first lower layer part opposite to the first optical waveguide through the buffer layer; and a first upper layer part provided above the first lower layer part. The second signal electrode has a second lower layer part opposite to the second optical waveguide through the buffer layer; and a second upper layer part provided above the second lower layer part. The width of each of the lower surfaces of the first and second lower layer parts is smaller than the width of each of the first and second upper layer parts.

According to the present invention, by reducing the width of each of the lower surfaces of the lower layer parts of the first and second signal electrodes opposite to the first and second optical waveguides, an electric field can be concentrated on the first and second optical waveguides. Further, by increasing the width of the upper layer part of the signal electrode to increase the cross-sectional area of the electrode, skin effect can be reduced. Thus, there can be provided a differential optical modulator having satisfactory high-frequency characteristics and capable of being driven with a low voltage.

It is preferable that the optical modulator according to the present invention further includes an insulating layer formed on the buffer layer and an electrode layer including the first and second upper layer parts and formed on the insulating layer and that the first and second lower layer parts are each embedded in openings formed in the insulating layer. With this configuration, it is possible to easily form a signal electrode having a two-layer structure.

In the present invention, the electrode layer preferably further includes first and second ground electrodes provided so as to sandwich the first and second signal electrodes in a plan view. In this case, the electrode layer preferably includes at least a part of each of the first and second ground electrodes. With this configuration, there can be provided an optical modulator having satisfactory high-frequency characteristics and reduced radiation loss and wavelength chirp.

In the present invention, at least a part of the insulating layer existing at the lower portion of an electrode isolation area between the first and second signal electrodes is preferably removed. By removing a part of the insulating layer existing between the first and second signal electrodes, effective dielectric constant of traveling-wave electrodes can be reduced, whereby the effective refractive index of the traveling-wave electrode is made to coincide with the effective refractive index of light to improve velocity matching.

In the present invention, a gap between the first and second upper layer parts is preferably equal to or larger than a gap between the first and second lower layer parts. With this configuration, it is possible to enhance an effect of reducing electrode loss.

In the present invention, it is preferable that a cross-section structure of the first and second optical waveguides and the first and second signal electrodes is left-right symmetric in position. With this configuration, it is possible to realize a dual drive type optical modulator having reduced wavelength chirp.

It is preferable that the optical modulator according to the present invention further includes a protective layer formed on the waveguide layer, that the protective layer covers the both side surfaces of each of the first and second optical waveguides, and that the buffer layer is formed on the protective layer.

In the present invention, the width of each of the lower surfaces of the first and second lower layer parts is preferably larger than the width of each of the first and second optical waveguides. With this configuration, an electric field can be evenly applied to the entire optical waveguide in the width direction thereof, whereby it is possible to realize an optical modulator having satisfactory high-frequency characteristics and capable of being driven with a low voltage.

In the optical modulator according to the present invention, it is preferable that each of the first and second optical waveguides has at least one linear section and at least one curved section, that the first lower layer part is opposed to the linear section of the first optical waveguide through the buffer layer, and that the second lower layer part is opposed to the linear section of the second optical waveguide through the buffer layer. In this case, it is preferable that the linear section includes first to third linear sections extending parallel to one another, that the curved section includes a first curved section connecting the first and second linear sections and a second curved section connecting the second and third linear sections, that the first lower layer part of the first signal electrode covers the first optical waveguide at at least one of the first to third linear sections through the buffer layer, and that the second lower layer part of the second signal electrode covers the second optical waveguide at at least one of the first to third linear sections through the buffer layer. With this configuration, the optical waveguide can be configured in a folded shape to reduce the element length. In particular, when an optical waveguide formed of a lithium niobate film is used, it has small loss even when the curvature radius thereof is reduced up to about 50 μm, and the effects of the present invention are significant.

In the present invention, it is preferable that the substrate is a single crystal substrate, that the electro-optic material film is a lithium niobate film, that the lithium niobate film is an epitaxial film having a film thickness of equal to or less than 2 μm, and that the c-axis of the lithium niobate film is oriented perpendicular to the main surface of the substrate. When a Mach-Zehnder optical waveguide of an optical modulator is formed using the lithium niobate film, the optical waveguide can be made very thin and narrow in line width, whereby a small-sized and high-quality optical modulator can be obtained. However, since the optical waveguide is thin and narrow in line width, a problem of the electric field concentration is conspicuous. However, according to the present invention, such a problem can be solved, and thus there can be provided an optical modulator having satisfactory high-frequency characteristics and reduced wavelength chirp and capable of being driven with a low voltage.

Advantages Effects of the Invention

According to the present invention, there can be provided a dual drive type optical modulator having low electrode loss, having satisfactory high-frequency characteristics, and capable of being driven with a low voltage due to improvement in efficiency of the electric field to be applied to the optical waveguide.

BRIEF DESCRIPTION OF DRAWINGS

FIGS. 1A and 1B are plan views of an optical modulator 100 according to a first embodiment of the present invention, in which FIG. 1A illustrates only an optical waveguide, and FIG. 1B illustrates the entire configuration of the optical modulator 100 including traveling-wave electrodes.

FIGS. 6A and 6B are plan views of an optical modulator 500 according to a fifth embodiment of the present invention, in which FIG. 6A illustrates only the optical waveguide, and FIG. 6B illustrates the entire configuration of the optical modulator 500 including the traveling-wave electrodes.

MODE FOR CARRYING OUT THE INVENTION

Preferred embodiments of the present invention will be described in detail with reference to the accompanying drawings.

Figure 1A:
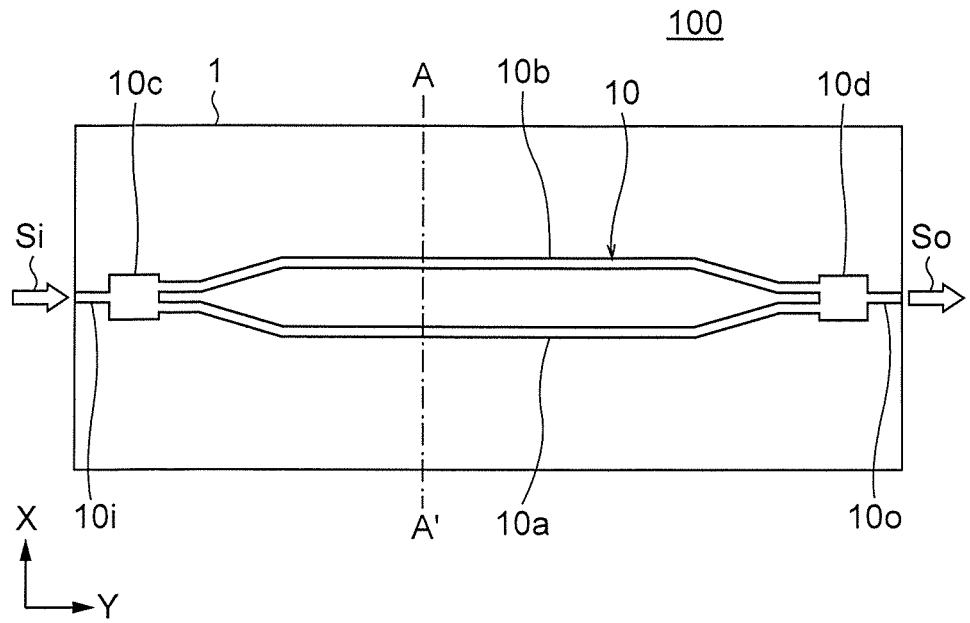
Figure 1B:
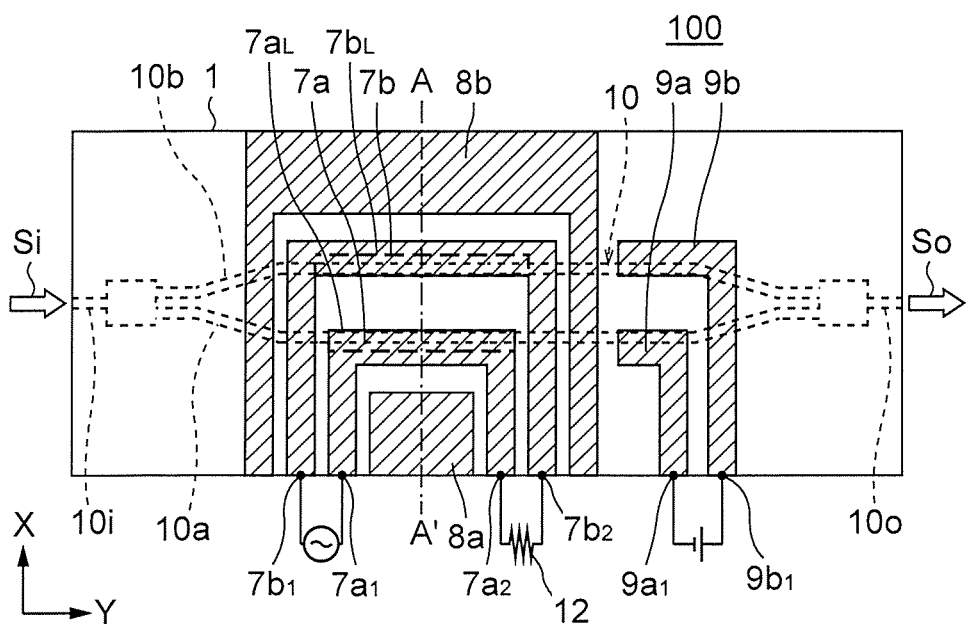

FIGS. 1A and 1B are plan views of an optical modulator 100 according to a first embodiment of the present invention. FIG. 1A illustrates only an optical waveguide 10, and FIG. 1B illustrates the entire configuration of the optical modulator 100 including traveling-wave electrodes.

As illustrated in FIGS. 1A and 1B, the optical modulator 100 includes a Mach-Zehnder optical waveguide 10 formed on a substrate 1 and having first and second optical waveguides 10a and 10b provided in parallel to each other, a first signal electrode 7a provided overlapping the first optical waveguide 10a, a second signal electrode 7b provided overlapping the second optical waveguide 10b, first and second ground electrodes 8a and 8b provided sandwiching the first and second signal electrodes 7a and 7b therebetween, a first bias electrode 9a provide overlapping the first optical waveguide 10a, and a second bias electrode 9b provided overlapping the second optical waveguide 10b.

The Mach-Zehnder optical waveguide 10 is an optical waveguide having a Mach-Zehnder interferometer structure. The Mach-Zehnder optical waveguide 10 has the first and second optical waveguides 10a and 10b which are branched from a single input optical waveguide 10i at a branch part 10c, and the first and second optical waveguides 10a and 10b are combined into a single output optical waveguide 10o at a multiplexing part 10d. An input light Si is branched at the branch part 10c. The branched lights travel through the first and second optical waveguides 10a and 10b and then multiplexed at the multiplexing part 10d. The multiplexed light is output from the output optical waveguide 10o as a modulated light So.

The first and second signal electrodes 7a and 7b are positioned between the first and second ground electrodes 8a and 8b in a plan view. One ends $7a_1$ and $7b_1$ of the first and second signal electrodes 7a and 7b each serve as a signal input terminal, and the other ends $7a_2$ and $7b_2$ thereof are connected to each other through a terminal resistor 12. Alternatively, the other end 7a2 of the first signal electrode 7a may be connected to the first ground electrode 8a through a first terminal resistor, and the other end $7b_2$ of the second signal electrode 7b may be connected to the second ground electrode 8b through a second terminal resistor. As a result, the first and second signal electrodes 7a and 7b function as coplanar traveling-wave electrodes together with the first and second ground electrodes 8a and 8b. Although details will be described later, the first and second signal electrodes 7a and 7b each have a two-layer structure. A lower layer part $7a_L$ of the first signal electrode 7a denoted by a thick dashed line overlaps the first optical waveguide 10a in a plan view, and a lower layer part $7b_L$ of the second signal electrode 7b denoted by a thick dashed line overlaps the second optical waveguide 10b in a plan view.

The first and second bias electrodes 9a and 9b are provided independently of the first and second signal electrode 7a and 7b, respectively, so as to apply direct-current bias voltage (DC bias) to the first and second optical waveguides 10a and 10b. One ends $9a_1$ and $9b_1$ of the first and second bias electrodes 9a and 9b are each an input terminal of the DC bias. Although, in the present embodiment, the first and second bias electrodes 9a and 9b are positioned closer to the output terminal side of the Mach-Zehnder optical waveguide 10 than the formation area of the first and second signal electrode 7a and 7b are, they may be positioned closer to the input terminal side. Further, the first and second bias electrodes 9a and 9b may be omitted, and instead, a modulated signal including superimposed DC bias may be input to the first and second signal electrode 7a and 7b.

Differential signals (modulated signals) having the same absolute value but opposite signs are input to the one end $7a_1$ of the first signal electrode 7a and one end $7b_1$ of the second signal electrode 7b. The first and second optical waveguides 10a and 10b are formed of a material, such as lithium niobate having electro-optic effect, so that the refractive indices of the first and second optical waveguides 10a and 10b are changed with +Δn and −Δn by an electric field applied to the first and second optical waveguides 10a and 10b, with the result that a phase difference between the pair of optical waveguides changes. A signal light modulated by the change in the phase difference is output from the output optical waveguide 10o.

As described above, the optical modulator 100 according to the present embodiment is of a dual drive type constituted by the pair of signal electrodes 7a and 7b, so that it is possible to increase the symmetry of the electric field to be applied to the pair of optical waveguides to thereby reduce the wavelength chirp.

Figure 2:
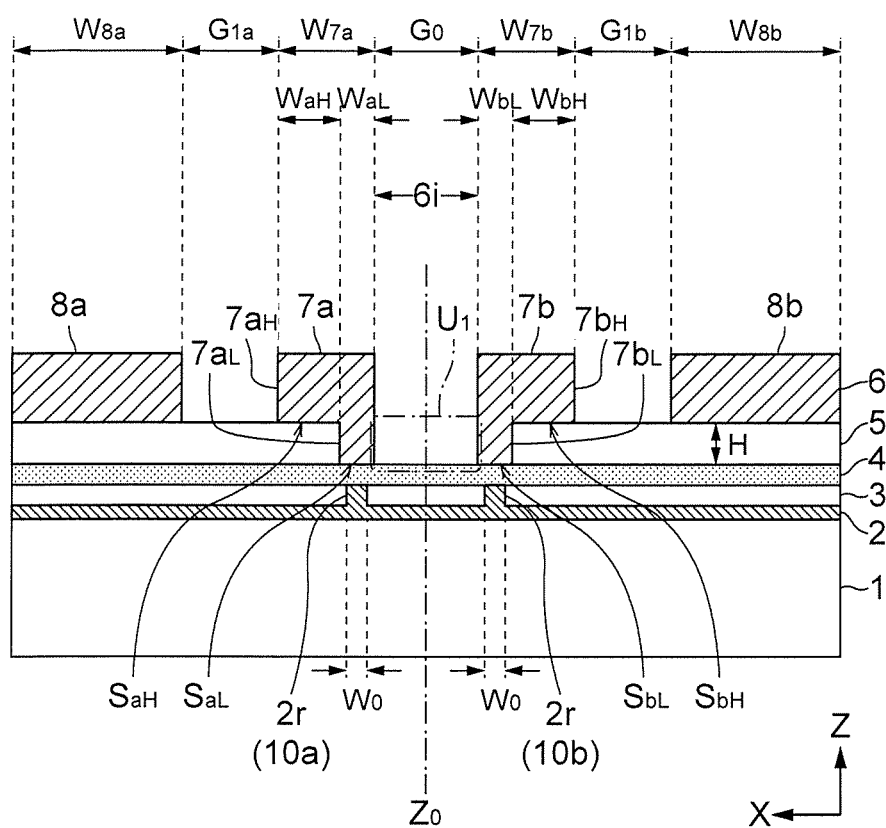
FIG. 2 is a schematic cross-sectional view of the optical modulator 100 taken along line A-A' in FIGS. 1A and 1B.

FIG. 2 is a schematic cross-sectional view of the optical modulator 100 taken along line A-A' in FIGS. 1A and 1B.

As illustrated in FIG. 2, the optical modulator 100 according to the present embodiment has a multilayer structure including a substrate 1, a waveguide layer 2, a protective layer 3, a buffer layer 4, an insulating layer 5 and an electrode layer 6 which are laminated in this order. The substrate 1 is, e.g., a sapphire substrate, and the waveguide layer 2 formed of an electro-optic material, such as a lithium niobate film, is formed on the surface of the substrate 1. The waveguide layer 2 has the first and second optical waveguides 10a and 10b each formed by a ridge part 2r. A ridge width $W_0$ of each of the first and second optical waveguides 10a and 10b adjacent to each other can be set to, e.g., 1 μm.

The protective layer 3 is formed in an area not overlapping the first and second optical waveguides 10a and 10b in a plan view. The protective layer 3 covers the entire area of the upper surface of the waveguide layer 2 excluding portions where the ridge parts 2r are formed, and the side surfaces of each of the ridge parts 2r are also covered with the protective layer 3, so that scattering loss caused due to the roughness of the side surfaces of the ridge part 2r can be prevented. The thickness of the protective layer 3 is substantially equal to the height of the ridge part 2r of the waveguide layer 2. There is no particular restriction on the material of the protective layer 3 and, for example, silicon oxide ($SiO_2$) may be used.

The buffer layer 4 is formed on the upper surfaces of the ridge parts 2r of the waveguide layer 2 so as to prevent light propagating through the first and second optical waveguides 10a and 10b from being absorbed by the first and second signal electrodes 7a and 7b. The buffer layer 4 is preferably formed of a material having a lower refractive index than that of the waveguide layer 2 and a high transparency, such as $Al_2O_3$, $SiO_2$, $LaAlO_3$, $LaYO_3$, ZnO, $HfO_2$, MgO, or $Y_2O_3$, and the thickness thereof may be about 0.2 μm to 1 μm. Although the buffer layer 4 is more preferably formed of a material having a higher dielectric constant than the insulating layer 5, it may be formed of the same material as the insulating layer 5. In the present embodiment, although the buffer layer 4 covers not only the upper surfaces of the respective first and second optical waveguides 10a and 10b, but also the entire underlying surface including the upper surface of the protective layer 3, it may be patterned so as to selectively cover only the vicinity of the upper surfaces of the first and second optical waveguides 10a and 10b. Further, the buffer layer 4 may be directly formed on the upper surface of the waveguide layer 2 with the protective layer 3 omitted.

The film thickness of the buffer layer 4 is preferably as large as possible in order to reduce light absorption of an electrode and preferably as small as possible in order to apply a high electric field to the first and second optical waveguides 10a and 10b. The light absorption and applied voltage of an electrode have a trade-off relation, so that it is necessary to set an adequate film thickness according to the purpose. The dielectric constant of the buffer layer 4 is preferably as high as possible, because the higher the dielectric constant thereof, the more VπL (index representing electric field efficiency) is reduced. Further, the refractive index of the buffer layer 4 is preferably as low as possible, because the lower the refractive index thereof, the thinner the buffer layer 4 can be. In general, a material having a high dielectric constant has a higher refractive index, so that it is important to select a material having a high dielectric constant and a comparatively low refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7 and are thus particularly preferable.

The insulating layer 5 is provided to form a level difference on the lower surface of the traveling-wave electrode. The insulating layer 5 is preferably formed of a material having a low dielectric constant, such as $SiO_2$. Openings (slits) are formed in areas of the insulating layer that overlap the respective first and second optical waveguides 10a and 10b to expose the upper surface of the buffer layer 4 therethrough. A part of the conductive material of the electrode layer 6 is embedded in the openings, whereby the level differences are formed on the lower surfaces of the first and second signal electrode 7a and 7b, respectively. The thickness of the insulating layer 5 is preferably equal to or larger than 1 μm. When the thickness of the insulating layer 5 is equal to or larger than 1 μm, an effect of the formation of the level difference on the lower surfaces of the respective first and second signal electrode 7a and 7b can be obtained.

At least a part (part surrounded by the dashed line $U_1$) of the insulating layer 5 that exists at the lower portion of an electrode isolation area 6i between the first and second signal electrode 7a and 7b is preferably removed, whereby at least a part of the upper surface of the buffer layer 4 is exposed. The insulating layer 5 may be removed in a part of the electrode isolation area 6i, not in the entire electrode isolation area 6i. As described above, in the present embodiment, the insulating layer 5 existing in the electrode isolation area 6i between the first and second signal electrode 7a and 7b is removed, so that the effective refractive index of the traveling-wave electrode is made to coincide with the effective refractive index of light to improve velocity matching.

The electrode layer 6 is provided with the first signal electrode 7a, second signal electrode 7b, first ground electrode 8a and second ground electrode 8b. The first signal electrode 7a is provided overlapping the ridge part 2r corresponding to the first optical waveguide 10a so as to modulate light traveling inside the first optical waveguide 10a and is opposed to the first optical waveguide 10a through the buffer layer 4. The second signal electrode 7b is provided overlapping the ridge part 2r corresponding to the second optical waveguide 10b so as to modulate light traveling inside the second optical waveguide 10b and is opposed to the second optical waveguide 10b through the buffer layer 4. The first ground electrode 8a is provided on the side opposite the second signal electrode 7b with respect to the first signal electrode 7a, and the second ground electrode 8b is provided on the side opposite the first signal electrode 7a with respect to the second signal electrode 7b.

In the cross-sectional structure illustrated in FIG. 2 obtained by vertically cutting the first and second optical waveguides 10a and 10b, an electrode structure in the area between the first and second ground electrodes 8a and 8b is left-right symmetric with respect to a symmetric axis $Z_0$ positioned at the center of the electrode isolation area 6i. Thus, the magnitudes of electric fields applied from the first and second signal electrode 7a and 7b to the respective first and second optical waveguides 10a and 10b can be made the same as much as possible, whereby the wavelength chirp can be reduced.

Although the waveguide layer 2 is not particularly limited in type so long as it is formed of an electro-optic material, it is preferably formed of lithium niobate ($LiNbO_3$). This is because lithium niobate has a large electro-optic constant and is thus suitable as the constituent material of an optical device such as an optical modulator. Hereinafter, the configuration of the present embodiment when the waveguide layer 2 is formed using a lithium niobate film will be described in detail.

Although the substrate 1 is not particularly limited in type as long as it has a lower refractive index than the lithium niobate film, it is preferably a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The "epitaxial film" refers to a film having the crystal orientation of the underlying substrate or film. Assuming that the film surface extends in X-Y plane and that the film thickness direction is Z-axis direction, the crystal of the epitaxial film is uniformly oriented along the X-axis and Y-axis on the film surface and along the Z-axis in the thickness direction. For example, the epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002) and other equivalent surfaces.

Secondly, poles must be observable in the measurement. Under the condition where the peak intensities are measured at the first orientation position, only the orientation in a single direction is proved. Even if the first condition is satisfied, in the case of nonuniformity in the in-plane crystalline orientation, the X-ray intensity does not increase at a particular angle, and poles cannot be observed. Since $LiNbO_3$ has a trigonal crystal system structure, single-crystal $LiNbO_3$ (014) has 3 poles. For the lithium niobate film, it is known that crystals rotated by 180° about the c-axis are epitaxially grown in a symmetrically coupled twin crystal state. In this case, three poles are symmetrically coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_AA_yO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of equal to or smaller than 2 μm. This is because a high-quality lithium niobate film having a thickness larger than 2 μm is difficult to form. The lithium niobate film having an excessively small thickness cannot completely confine light in it, allowing the light to penetrate through the substrate 1 and/or the buffer layer 4. Application of an electric field to the lithium niobate film may therefore cause a small change in the effective refractive index of the optical waveguides (10a and 10b). Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 1 can change the optical refractive index in proportion to the electric field. In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing the lithium niobate single crystal substrate. This method has an advantage that characteristics same as those of the single crystal can be obtained and can be applied to the present invention.

The first signal electrode 7a has a two-layer structure and has an upper layer part $7a_H$ formed on the electrode layer 6 and a lower layer part $7a_L$ embedded in an opening (first opening) penetrating the insulating layer 5. The lower layer part $7a_L$ of the first signal electrode 7a is positioned at an end portion of the upper layer part $7a_H$ of the first signal electrode 7a that is close to the second signal electrode 7b. Accordingly, a lower surface (first lower surface) $S_{aL}$ of the lower layer part $7a_L$ of the first signal electrode 7a is positioned closer to the second signal electrode 7b than a lower surface (second lower surface) $S_{aH}$ of the upper layer part $7a_H$ is. With this configuration, the first lower surface $S_{aL}$ of the first signal electrode 7a contacts the upper surface of the buffer layer 4 above the first optical waveguide 10a to cover the first optical waveguide 10a through the buffer layer 4. The second lower surface $S_{aH}$ of the first signal electrode 7a is positioned above the first lower surface $S_{aL}$ and does not contact the buffer layer 4.

A width $W_{aL}$ (width of the first lower surface $S_{aL}$) of the lower layer part $7a_L$ of the first signal electrode 7a is smaller than a width $W_{7a}$ (entire width of the first signal electrode 7a) of the upper layer part $7a_H$. The lower layer part $7a_L$ is formed only near an area that overlaps the first optical waveguide 10a in a plan view and is not formed in other areas other than that. Thus, the width $W_{aL}$ of the first lower surface $S_{aL}$ of the first signal electrode 7a is slightly larger than the ridge width $W_0$ of the first optical waveguide 10a. To concentrate an electric field from the first signal electrode 7a on the first optical waveguide 10a, the width $W_{aL}$ of the first lower surface $S_{aL}$ of the first signal electrode 7a is preferably 1.1 times to 15 times, more preferably, 1.5 times to 10 times the ridge width $W_0$ of the first optical waveguide 10a. To ensure a sufficient cross-sectional area of the upper layer part $7a_H$ of the first signal electrode 7a, the width $W_{aH}$ of the second lower surface $S_{aH}$ is preferably larger than the width $W_{aL}$ of the first lower surface $S_{aL}$.

The second signal electrode 7b also has a two-layer structure and has an upper layer part $7b_H$ formed on the electrode layer 6 and a lower layer part $7b_L$ embedded in an opening (second opening) penetrating the insulating layer 5. The lower layer part $7b_L$ of the second signal electrode 7b is positioned at an end portion of the upper layer part $7b_H$ of the second signal electrode 7b close to the first signal electrode 7a. Accordingly, a lower surface (first lower surface) $S_{bL}$ of the upper layer part $7b_H$ of the second signal electrode 7b is positioned closer to the first signal electrode 7a than a lower surface (second lower surface) $S_{bH}$ of the lower layer part $7b_L$ is. With this configuration, the first lower surface $S_{bL}$ of the second signal electrode 7b contacts the upper surface of the buffer layer 4 above the second optical waveguide 10b to cover the second optical waveguide 10b through the buffer layer 4. The second lower surface $S_{bH}$ of the second signal electrode 7b is positioned above the first lower surface $S_{bL}$ and does not contact the buffer layer 4.

A width $W_{bL}$ (width of the second lower surface $S_{bL}$) of the lower layer part $7b_L$ of the second signal electrode 7b is smaller than a width $W_{7b}$ (entire width of the second signal electrode 7b) of the upper layer part $7b_H$. The lower layer part $7b_L$ is formed only near an area that overlaps the second optical waveguide 10b in a plan view and is not formed in other areas than that. Thus, the width $W_{bL}$ of the first lower surface $S_{bL}$ of the second signal electrode 7b is slightly larger than the ridge width $W_0$ of the second optical waveguide 10b. To concentrate an electric field from the second signal electrode 7b on the second optical waveguide 10b, the width $W_{bL}$ of the first lower surface $S_{bL}$ of the second signal electrode 7b is preferably 1.1 times to 15 times, more preferably, 1.5 times to 10 times the ridge width $W_0$ of the second optical waveguide 10b. To ensure a sufficient cross-sectional area of the upper layer part $7b_H$ of the second signal electrode 7b, the width $W_{bH}$ of the second lower surface $S_{bH}$ is preferably larger than the width $W_{bL}$ of the first lower surface $S_{bL}$.

Although the first and second ground electrodes 8a and 8b each have a single-layer structure including only a conductor provided in the electrode layer 6, they may each have a two-layer structure like the first and second signal electrode 7a and 7b. That is, the first and second ground electrodes 8a and 8b may each include a conductor embedded in an opening formed in the insulating layer 5 and contacting the upper surface of the buffer layer 4. Further, the first and second ground electrodes 8a and 8b may each include a conductor embedded in an opening penetrating the insulating layer 5 and buffer layer 4 and contacting the upper surface of the protective layer 3.

Widths $W_{8a}$ and $W_{8b}$ of the first and second ground electrodes 8a and 8b are preferably larger than the widths $W_{7a}$ and $W_{7b}$ of the first and second signal electrode 7a and 7b. By setting the areas of the first and second ground electrodes 8a and 8b to be larger than the areas of the first and second signal electrode 7a and 7b, respectively, radiation loss can be reduced to thereby obtain satisfactory high-frequency characteristics. The width $W_{8a}$ of the first ground electrode 8a may be equal to or different from the width $W_{8b}$ of the second ground electrode 8b.

As described above, the electrode structure in the area between the first and second ground electrodes 8a and 8b is left-right symmetric with respect to the symmetric axis $Z_0$. Thus, the entire width $W_{7a}$ and entire width $W_{7b}$ of the first and second signal electrode 7a and 7b are equal to each other, the widths $Wa_L$ and $Wb_L$ of the lower surfaces $Sa_L$ and $Sb_L$ of the lower layer parts $7a_L$ and $7b_L$ are also equal to each other, and the widths $Wa_H$ and $Wb_H$ of the lower surfaces $Sa_H$ and $Sb_H$ of the upper layer parts $7a_H$ and $7b_H$ are also equal to each other. Further, a gap $G_{1a}$ between the first signal electrode 7a and the first ground electrode 8a and a gap $G_{1b}$ between the second signal electrode 7b and the second ground electrode 8b are equal to each other.

The inner side surface of the lower layer part $7a_L$ of the first signal electrode 7a is flush with the inner side surface of the upper layer part $7a_H$ of the first signal electrode 7a, and the inner side surface of the lower layer part $7b_L$ of the second signal electrode 7b is flush with the inner side surface of the upper layer part $7b_H$ of the second signal electrode 7b. Accordingly, a gap ($G_{0L}$) between the lower layer part $7a_L$ and the lower layer part $7b_L$ and a gap ($G_{0H}$) between the upper layer part $7a_H$ and the upper layer part $7b_H$ are equal to each other, and both are G0 ($G_{0L}=G_{0H}=G_0$). The gap between two electrodes refers to the shortest distance therebetween in the X-direction.

The gap $G_{1a}$ between the first signal electrode 7a and the first ground electrode 8a and the gap $G_{1b}$ between the second signal electrode 7b and the second ground electrode 8b are preferably larger than the gap $G_0$ between the first and second signal electrodes 7a and 7b. By setting the gaps $G_{1a}$ and $G_{1b}$ between the signal electrodes 7a, 7b and the ground electrodes 8a, 8b to be larger than the gap $G_0$ between the first and second signal electrodes 7a and 7b, influence that the first and second ground electrodes 8a and 8b have on the electric fields to be applied respectively to the pair of optical waveguides can be reduced. This can make the magnitudes of the electric fields to be applied respectively to the first and second optical waveguides 10a and 10b as equal as possible to thereby reduce the wavelength chirp.

As described above, in the optical modulator 100 according to the present embodiment, the first and second signal electrode 7a and 7b each have a two-layer structure, and the widths $Wa_L$ and $Wb_L$ of the lower surfaces $Sa_L$ and $Sb_L$ of the lower layer parts $7a_L$ and $7b_L$ are smaller than the electrode widths $W_{7a}$ and $W_{7b}$ (the maximum widths of the respective first and second signal electrodes 7a and 7b) of the upper layer parts $7a_H$ and $7b_H$, respectively, so that an electric field can be concentrated on the first and second optical waveguides 10a and 10b, allowing improvement in electric field efficiency. Further, since the electrode widths $W_{7a}$ and $W_{7b}$ of the upper layer parts $7a_H$ and $7b_H$ of the first and second signal electrode 7a and 7b are smaller than the widths $W_{aL}$ and $W_{bL}$ of the lower surfaces $S_{aL}$ and $S_{bL}$ of the lower layer parts $7a_L$ and $7b_L$, the cross-sectional area of the signal electrode can be increased, allowing a reduction in electrode loss at high frequencies. Thus, it is possible to realize an optical modulator having satisfactory high-frequency characteristics and capable of being driven with a low voltage.

Figure 3:
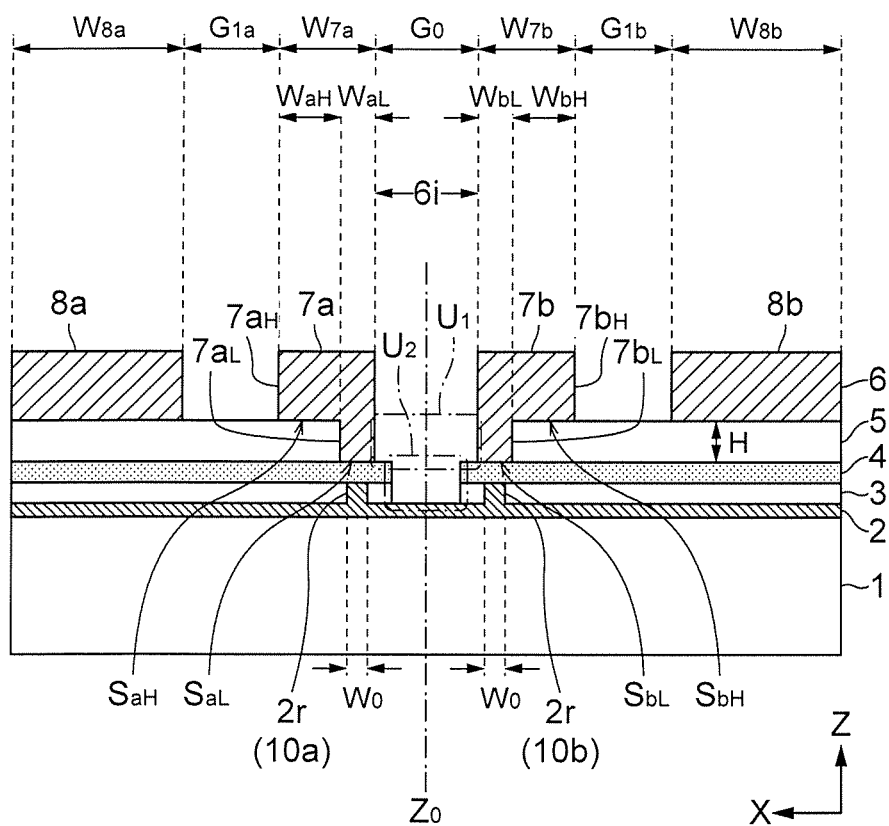
FIG. 3 is a schematic cross-sectional view illustrating the configuration of an optical modulator 200 according to a second embodiment of the present invention.

FIG. 3 is a schematic cross-sectional view illustrating the configuration of an optical modulator according to a second embodiment of the present invention.

As illustrated in FIG. 3, an optical modulator 200 according to the present embodiment is a first modification of the cross-sectional structure of the optical modulator 100 illustrated in FIG. 2 and is featured in that not only a part (part surrounded by the dashed line $U_1$) of the insulating layer 5 that exists at the lower portion of the electrode isolation area 6$i$ between the first and second signal electrodes 7$a$ and 7$b$, but also a part (part surrounded by dashed line $U_2$) of a laminated body of the buffer layer 4 and protective layer 3 that exist below the above part is removed to expose a part of the upper surface of the waveguide layer 2. The laminated body of the buffer layer 4 and protective layer 3 may be removed in a part of the electrode isolation area 6$i$, not in the entire electrode isolation area 6$i$. Further, as illustrated, the protective layer 3 is preferably left there so as to cover the side surface of the ridge part 2$r$. Furthermore, only the buffer layer 4 may be removed together with the insulating layer 5, leaving the protective layer 3 there. In this case, the protective layer 3 may be completely or partially left there.

As described above, in the present embodiment, not only the insulating layer 5, but also at least a part of the laminated body of the buffer layer 4 and protective layer 3 that exist below the insulating layer 5 is removed, so that effective dielectric constant of the traveling-wave electrode can be reduced further. Thus, the effective refractive index of the traveling-wave electrode is made to coincide with the effective refractive index of light to further improve velocity matching.

Figure 4:
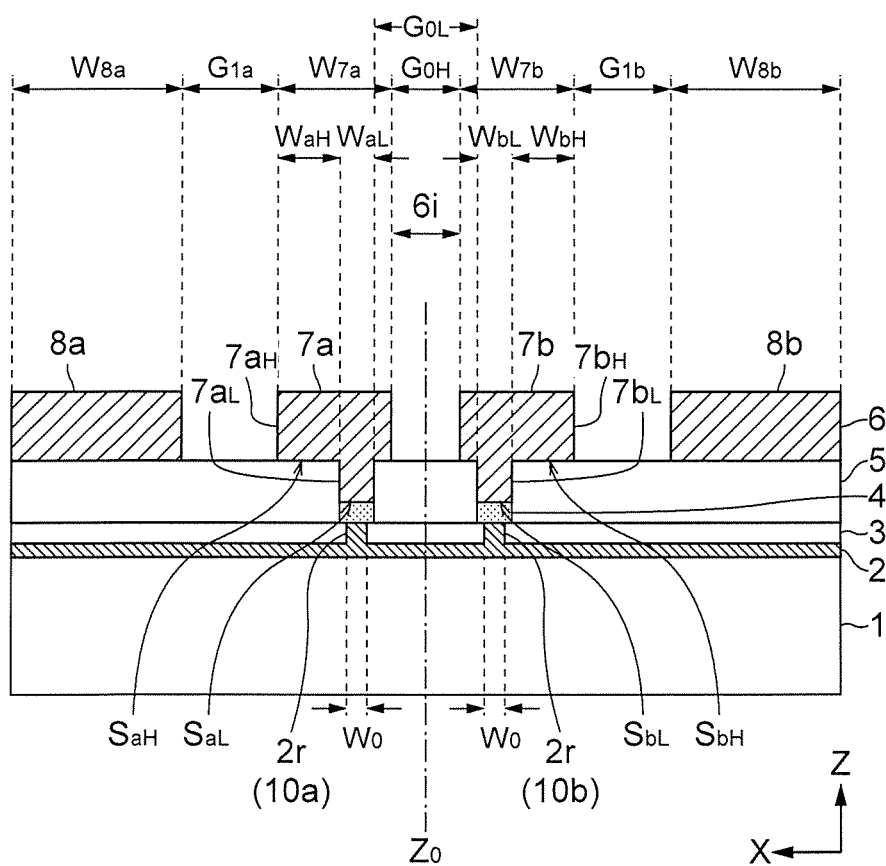
FIG. 4 is a schematic cross-sectional view illustrating the configuration of an optical modulator 300 according to a third embodiment of the present invention.

FIG. 4 is a schematic cross-sectional view illustrating the configuration of an optical modulator according to a third embodiment of the present invention.

As illustrated in FIG. 4, an optical modulator 300 according to the present embodiment is a second modification of the cross-sectional structure of the optical modulator 100 illustrated in FIG. 2 and is featured in that the insulating layer 5 exists at the lower portion of the electrode isolation area 6$i$ between the first and second signal electrode 7$a$ and 7$b$, and end portions close to the symmetric axis $Z_0$ of the upper layer parts 7$a_H$ and 7$b_H$ of the first and second signal electrode 7$a$ and 7$b$ protrude to the symmetric axis $Z_0$ from the lower layer parts 7$a_L$ and 7$b_L$. Further, the buffer layer 4 is patterned so as to selectively cover only the vicinity of the upper surfaces of the first and second optical waveguides 10$a$ and 10$b$. Other configurations are the same as those of the first embodiment.

In the present embodiment, the gap $G_{OH}$ between the upper layer parts 7$a_H$ and 7$b_H$ is smaller than the gap $G_{OL}$ between the lower layer parts 7$a_L$ and 7$b_L$, so that the present embodiment is disadvantageous in terms of velocity matching, as compared to the first embodiment. However, even with such a configuration, the same effects as those in the first embodiment can be obtained. That is, the widths of the upper layer parts 7$a_H$ and 7$b_H$ are larger than the widths of the lower layer parts 7$a_L$ and 7$b_L$, so that it is possible to increase the cross-sectional area of the signal electrode as compared to the case where the widths of the first and second signal electrodes 7$a$ and 7$b$ are evenly reduced to thereby reduce electrode loss at the high frequency. Thus, it is possible to realize an optical modulator having satisfactory high-frequency characteristics and capable of being driven with a low voltage.

Figure 5:
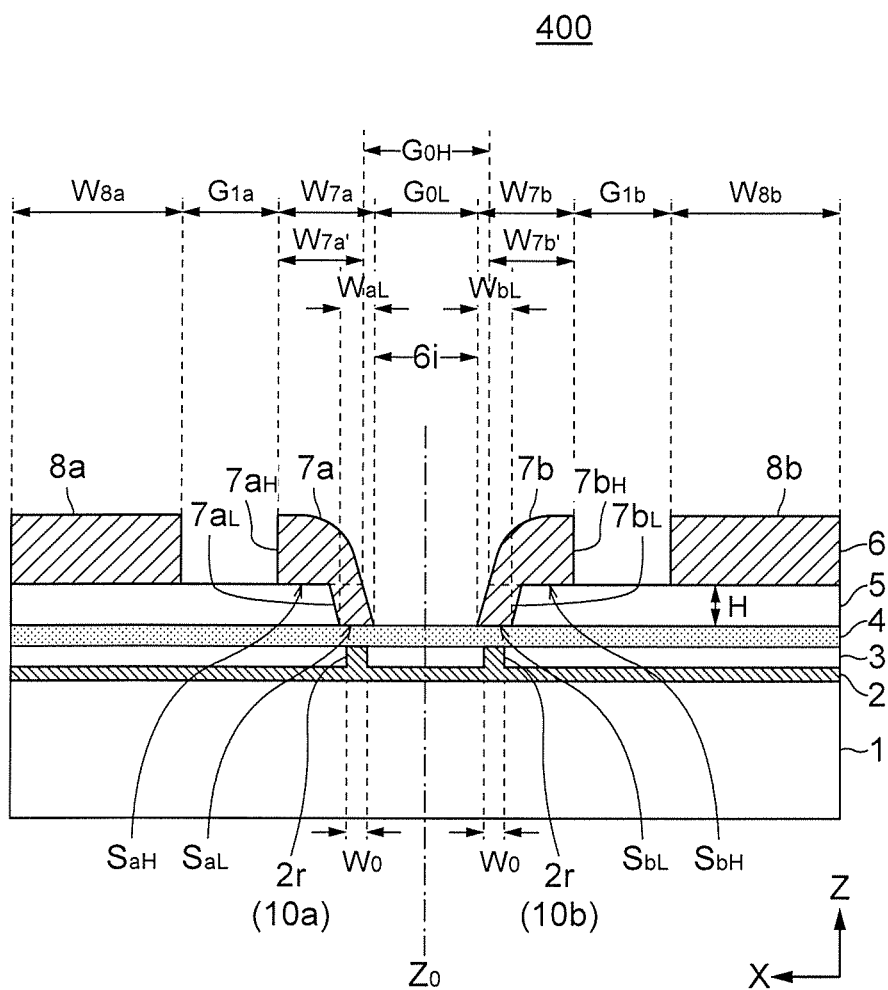
FIG. 5 is a schematic cross-sectional view illustrating the configuration of an optical modulator 400 according to a fourth embodiment of the present invention.

FIG. 5 is a schematic cross-sectional view illustrating the configuration of an optical modulator according to a fourth embodiment of the present invention.

As illustrated in FIG. 5, an optical modulator 400 according to the present embodiment is a third modification of the cross-sectional structure of the optical modulator 100 illustrated in FIG. 2 and is featured in that the opening of the insulating layer 5 has an inclined inner wall surface. Correspondingly, the lower layer parts 7$a_L$ and 7$b_L$ of the first and second signal electrodes 7$a$ and 7$b$ are inclined and, further, the inner corners (corners close to the symmetric axis $Z_0$) of the first and second signal electrodes 7$a$ and 7$b$ each have a gently rounded shape. Other configurations are the same as those of the first embodiment.

In the present embodiment, the gap $G_{OH}$ between the upper layer parts 7$a_H$ and 7$b_H$ of the first and second signal electrodes 7$a$ and 7$b$ is larger than the gap $G_{OL}$ between the lower layer parts 7$a_L$ and 7$b_L$ thereof, thereby facilitating velocity matching. The cross-sectional areas of the upper layer parts 7$a_H$ and 7$b_H$ of the first and second signal electrode 7$a$ and 7$b$ are smaller than those in the first embodiment; however, the cross-sectional areas of the upper layer parts 7$a_H$ and 7$b_H$ are ensured by making the widths of the upper layer parts 7$a_H$ and 7$b_H$ larger than the widths of the lower layer parts 7$a_L$ and 7$b_L$, so that the same effects as those in the first embodiment can be obtained. That is, the electrode widths $W_{7a}$ and $W_{7b}$ of the upper layer parts 7$a_H$ and 7$b_H$ are larger than the widths $W_{aL}$ and $W_{bL}$ of the lower surfaces $S_{aL}$ and $S_{bL}$ of the lower layer parts 7$a_L$ and 7$b_L$, so that it is possible to increase the cross-sectional area of the signal electrode as compared to the case where the widths of the first and second signal electrodes 7$a$ and 7$b$ are evenly reduced to thereby reduce electrode loss at the high frequency. Thus, it is possible to realize an optical modulator having satisfactory high-frequency characteristics and capable of being driven with a low voltage.

Figure 6A:
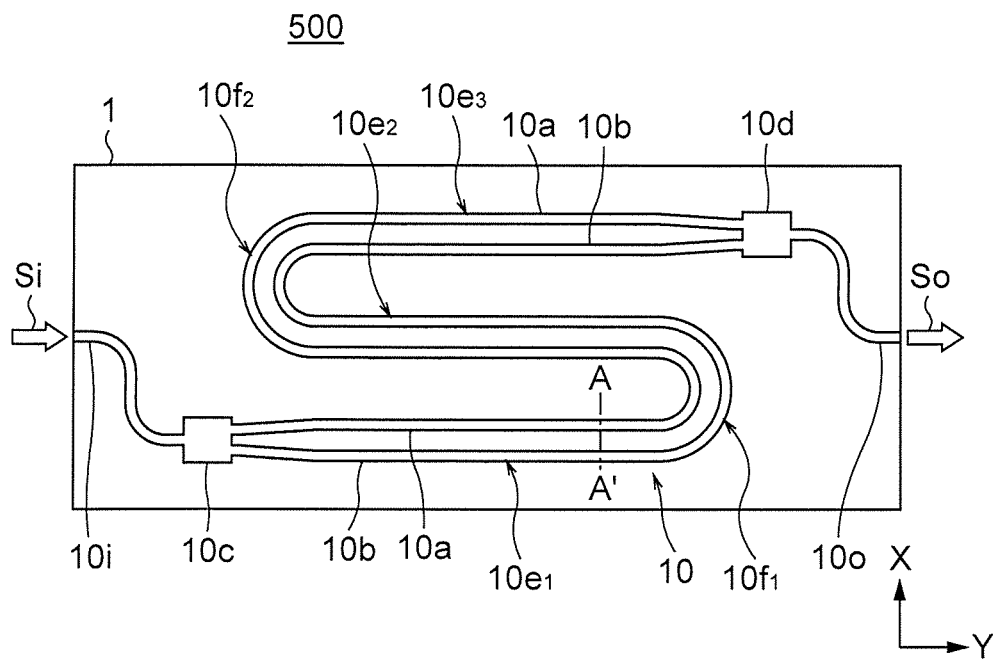
Figure 6B:
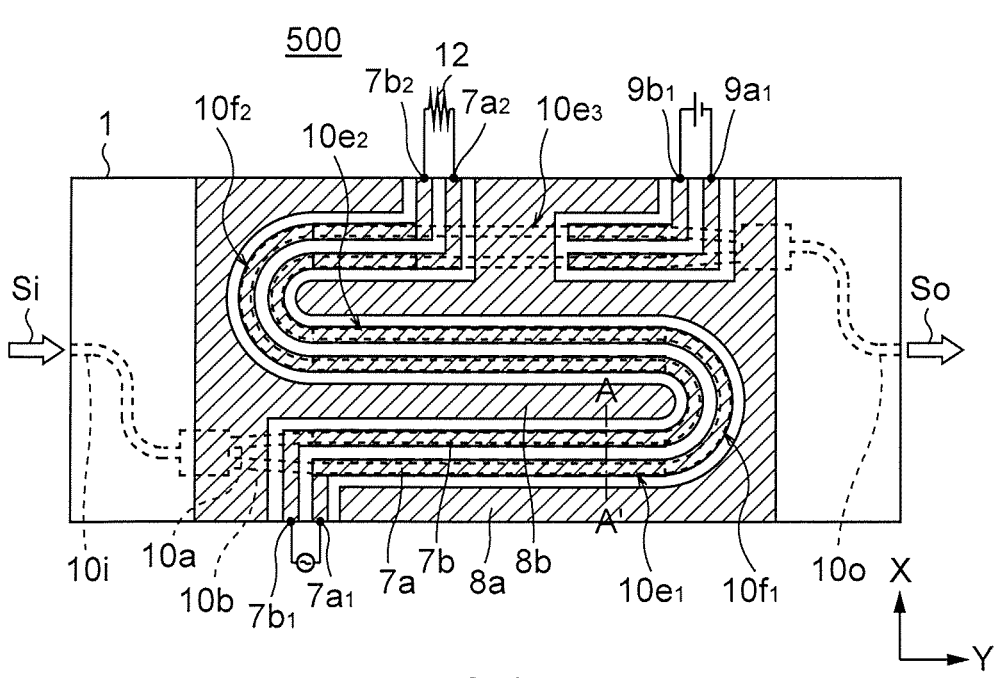

FIGS. 6A and 6B are plan views of an optical modulator 500 according to a fifth embodiment of the present invention. FIG. 6A illustrates only the optical waveguide, and FIG. 6B illustrates the entire configuration of the optical modulator 500 including the traveling-wave electrodes.

As illustrated in FIGS. 6A and 6B, the optical modulator 500 according to the present embodiment is featured in that the Mach-Zehnder optical waveguide 10 is constructed by a combination of a linear section and a curved section. Specifically, the Mach-Zehnder optical waveguide 10 has first to third linear sections 10$e_1$, 10$e_2$ and 10$e_3$ arranged parallel to one another, a first curved section 10$f_1$ connecting the first and second linear sections 10$e_1$ and 10$e_2$, and a second curved section 10$f_2$ connecting the second and third linear sections 10$e_2$ and 10$e_3$.

In the optical modulator 500 according to the present embodiment, the cross-sectional structures of the respective linear sections 10$e_1$, 10$e_2$ and 10$e_3$ of the Mach-Zehnder optical waveguide 10 taken along line A-A' in FIGS. 6A and 6B are each formed into those illustrated in FIGS. 2 to 5. That is, the first lower surface $S_{aL}$ of the first signal electrode 7$a$ covers the first optical waveguide 10$a$ at the first to third linear sections 10$e_1$, 10$e_2$ and 10$e_3$ through the buffer layer 4, and the first lower surface $S_{bL}$ of the second signal electrode 7$b$ covers the second optical waveguide 10$b$ at the first to third linear sections 10$e_1$, 10$e_2$ and 10$e_3$ through the buffer layer 4. Although the first and second bias electrodes 9$a$ and 9$b$ are not particularly limited in position, they cover the first and second optical waveguides 10$a$ and 10$b$ at the other part of the third linear section 10$e_3$. Although, in the present embodiment, the first and second signal electrodes 7$a$ and 7$b$ each entirely cover the first and second linear sections 10$e_1$ and 10$e_2$ and a part of the third linear section 10$e_3$, they may each cover only, e.g., the first linear section 10$e_1$.

In the present embodiment, the input light Si is input to one end of the first linear section 10$e_1$, travels from the one end of the first linear section 10$e_1$ toward the other end thereof, makes a U-turn at the first curved section 10$f_1$, travels from one end of the second linear section 10$e_2$ toward the other end thereof in the direction opposite to that in the first linear section 10$e_1$, makes a U-turn at the second curved section 10$f_2$, and travels from one end of the third linear section 10$e_3$ toward the other end thereof in the direction same as that in the first linear section 10$e_1$.

The optical modulator has a problem of a large element length in practical applications. However, by folding the optical waveguide as illustrated, the element length can be significantly reduced, obtaining a remarkable effect. Particularly, the optical waveguide formed of the lithium niobate film is featured in that it has small loss even when the curvature radius thereof is reduced up to about 50 μm and is thus suitable for the present embodiment.

While the preferred embodiments of the present invention have been described, the present invention is not limited to the above embodiments, and various modifications may be made within the scope of the present invention, and all such modifications are included in the present invention.

For example, in the above embodiments, the optical modulator has the pair of optical waveguides 10$a$ and 10$b$ each formed of the lithium niobate film epitaxially grown on the substrate 1; however, the present invention is not limited to such a structure, but the optical waveguides may be formed of an electro-optic material such as barium titanate or lead zirconium titanate. However, the optical waveguide formed of the lithium niobate film can be reduced in width, so that the electric field concentration is conspicuously achieved, and the effects of the present invention are great. Further, as the waveguide layer 2, a semiconductor material, a polymer material, or the like having electro-optic effect may be used.

Further, although the lower surfaces of the respective first and second signal electrodes 7$a$ and 7$b$ each have a two-step structure in the present invention, they may each have a step structure of three or more steps. In this case, a surface contacting the buffer layer 4 is the lower surface of the lower layer part. Further, the lower layer parts of the first and second signal electrodes 7$a$ and 7$b$ may have a tapered shape in which the widths thereof are gradually reduced toward the first and second optical waveguides 10$a$ and 10$b$, respectively.

EXAMPLES

Electric field efficiency of an optical modulator having a cross-sectional structure illustrated in FIG. 2 was evaluated by simulation. In this optical modulator, the substrate 1 was a sapphire single crystal substrate (specific dielectric constant: 10), the waveguide layer 2 was formed of a lithium niobate film, the protective layer 3 was formed of SiO$_2$ (specific dielectric constant: 4), the buffer layer 4 was formed of an oxide La-AL-O composed of, e.g., La and Al (specific dielectric constant: 13), the insulating layer 5 was formed of SiO$_2$ (specific dielectric constant: 4), and the electrode layer was made of Au. The thickness of the waveguide layer 2 was 1.5 μm, the slab thickness of the waveguide layer 2 was 0.4 μm (the thickness of the ridge part 2$r$ was 1.1 μm), the ridge width W$_0$ of the waveguide layer 2 was 1.2 μm, the thickness of the buffer layer 4 was 0.9 μm, the gap between the first and second waveguides was 14 μm, the thickness H of the insulating layer 5 was 2 μm, the width W$_{7a}$ of the upper layer part of the signal electrode was 9 μm (=W$_{7b}$), the width W$_{aL}$ of the lower layer part of the signal electrode was 3 μm (=W$_{bL}$), the thickness T of the electrode layer 6 was 3 μm, the gap G$_{1a}$ between the signal electrode and the ground electrode was 20 μm (=G$_{1b}$), and the electrode length (interaction length) of the signal electrode along the optical waveguide was 20 mm.

In the above configuration, when a signal frequency was 32 GHz, a half-wavelength voltage Vπ of 1.8 V and a band of 41 GHz were obtained and, thus, a wide-band optical modulator operating at 64 Gbaud can be obtained while supporting a wide band and achieving low voltage operation.

Figure 9:
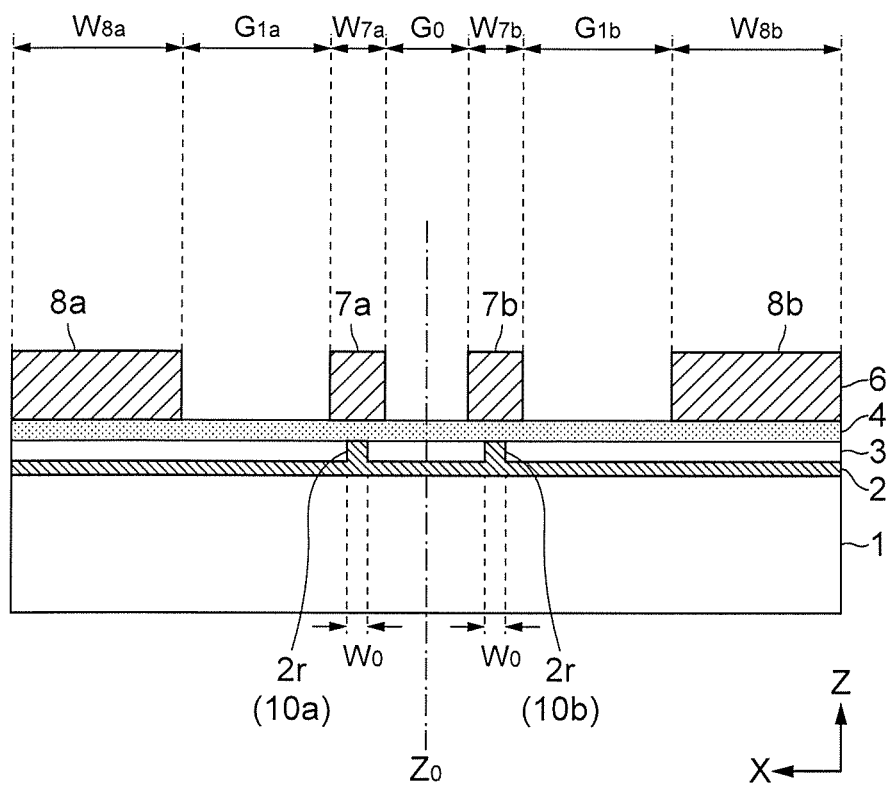
FIG. 9 is a schematic cross-sectional view illustrating the structure of an optical modulator according to a comparative example (H=0).

Next, in an optical modulator having the cross-sectional structure illustrated in FIG. 2, a change in VπL when the thickness (thickness H of the insulating layer 5) of each of the lower layer parts 7$a_L$ and 7$b_L$ of the first and second signal electrodes 7$a$ and 7$b$ was changed was calculated by simulation. The VπL is a parameter representing electric field efficiency, and the smaller the VπL is, the higher the electric field efficiency becomes. Vim is half-wavelength voltage, and L is electrode length. The thickness H of the insulating layer 5, which is a variable parameter, was set to six values of 0 μm (no level difference), 0.5 μm, 1 μm, 2 μm, 3 μm and 4 μm. The cross-sectional structure of an optical modulator 600 when the thickness H of the insulating layer 5 is 0 μm is illustrated in FIG. 9. The optical modulator 600 differs from the modulator 100 of FIG. 2 in that the insulating layer 5 is absent between the buffer layer 4 and the electrode layer 6 and thus the first and second signal electrodes 7$a$ and 7$b$ and first and second ground electrodes 8$a$ and 8$b$ are formed on the upper surface of the buffer layer 4. The width W$_{7a}$ of each of the first and second ground electrodes 8$a$ and 8$b$ are each 9 μm (=W$_{7b}$).

Figure 7:
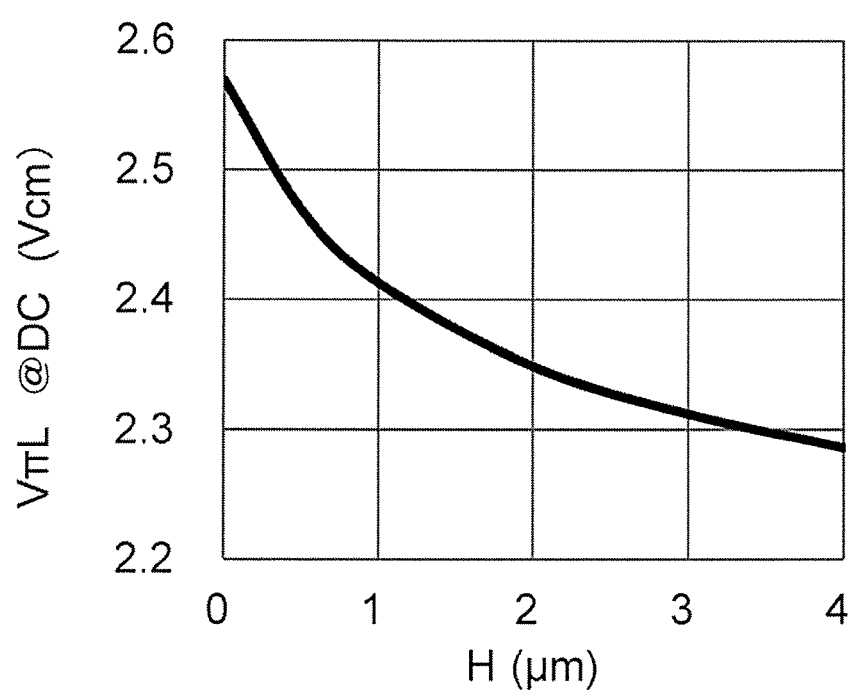
FIG. 7 is a graph illustrating the simulation result of VπL (electric field efficiency) when the height (thickness H of the insulating layer 5) of a level difference in a signal electrode is changed.

FIG. 7 is a graph illustrating the simulation result of the VπL. In FIG. 7, the horizontal axis indicates the thickness H (μm) of the insulating layer 5, and the vertical axis indicates the VπL (V cm). As can be seen from FIG. 7, providing the insulating layer 5 (H>0 μm) can improve the electric field efficiency even when the maximum width of the signal electrode is increased. In addition, it can be seen that the larger the thickness H of the insulating layer 5 is, the more the electric field efficiency is improved.

Next, in an optical modulator having the cross-sectional structure illustrated in FIG. 2, a change in electrode loss when the width W$_{7a}$ (=W$_{7b}$=W$_7$) of each of the upper layer parts 7$a_H$ and 7$b_H$ of the first and second signal electrodes 7$a$ and 7$b$ was changed was calculated. The W$_7$ of each of the upper layer parts 7$a_H$ and 7$b_H$, which is a variable parameter, was set to four values of 3 μm, 5 μm, 7 μm and 9 μm. The thickness H of the insulating layer 5 was set to three values of 0 μm, 2 μm and 4 μm.

Figure 8:
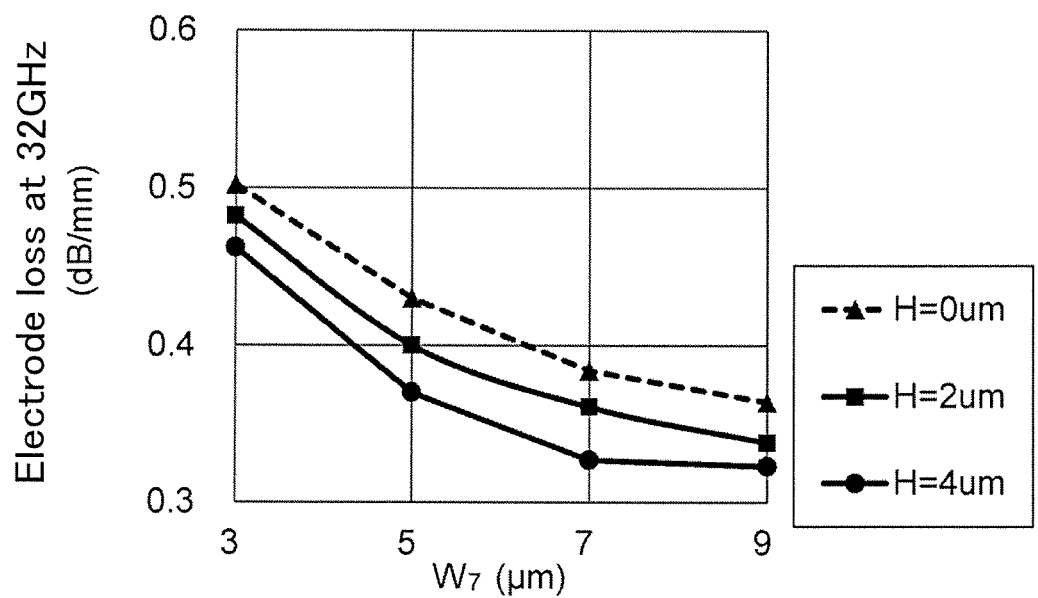
FIG. 8 is a graph illustrating the simulation result of electrode loss when a width $W_7$ ($=W_{7a}=W_{7b}$) of an upper layer part of the signal electrode is changed.

FIG. 8 is a graph illustrating the simulation result of electrode loss. In FIG. 8, the horizontal axis indicates the width W$_7$ (μm) of each of the upper layer parts 7$a_H$ and 7$b_H$ of the signal electrode, and the vertical axis indicates electrode loss (dB/mm). As can be seen from FIG. 8, the larger the width W$_7$ of each of the upper layer parts 7$a_H$ and 7$b_H$ is, the smaller the electrode loss becomes.

Figure 10:
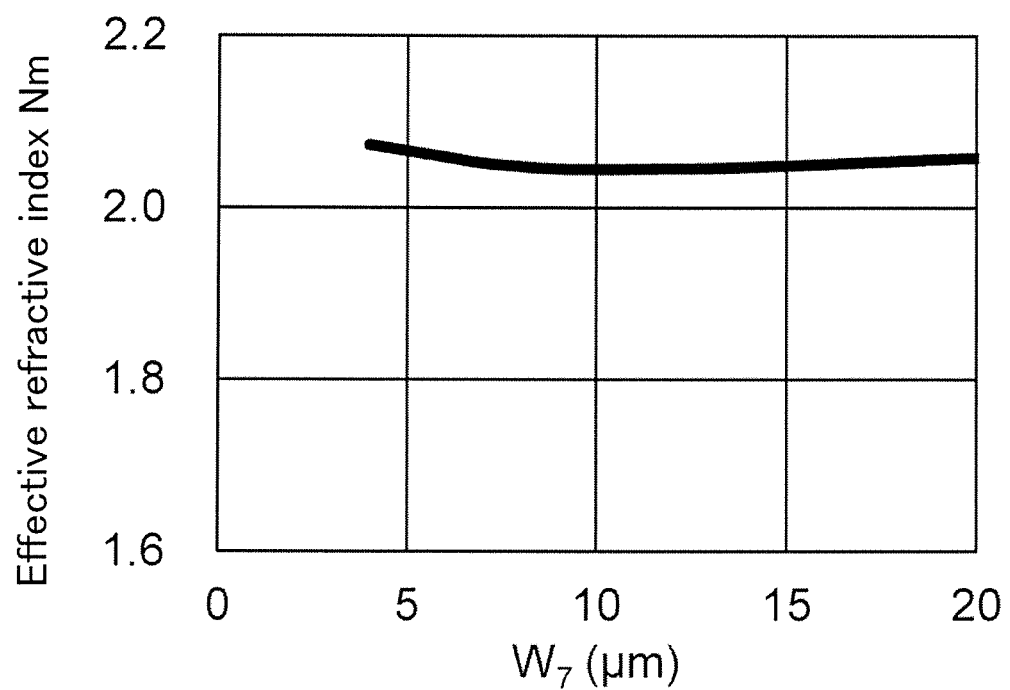
FIG. 10 is a graph illustrating the simulation result of an effective refractive index when the width $W_7$ ($=W_{7a}=W_{7b}$) of the upper layer part of the signal electrode is changed.

FIG. 10 is a graph illustrating the simulation result of the effective refractive index. In FIG. 10, the horizontal index indicates the width W$_7$ (μm) of each of the upper layer parts 7$a_H$ and 7$b_H$ of the signal electrode, and the vertical axis indicates an effective refractive index N$_m$ of a microwave. As can be seen from FIG. 10, even when the width W$_7$ of each of the upper layer parts 7$a_H$ and 7$b_H$ is increased, the effective refractive index N$_m$ changes little and is substantially equal to the effective refractive index (2.05) of light, thus satisfying the velocity matching condition.

Figure 11:
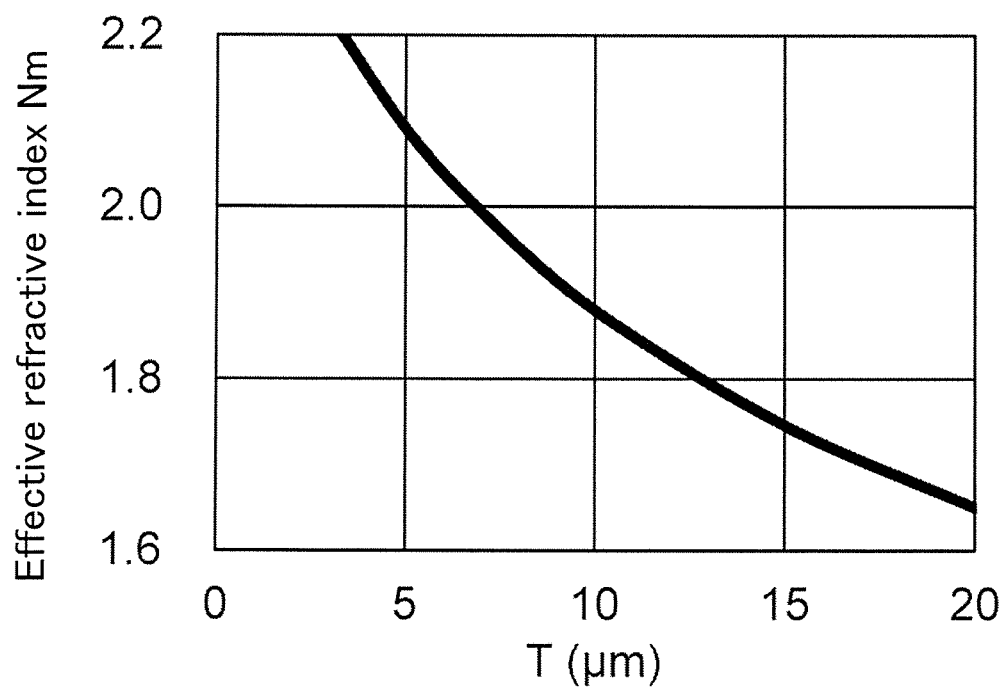
FIG. 11 is a graph illustrating the simulation result of the effective refractive index when a thickness T of each of electrodes 7a, 7b, 8a and 8b is changed in the comparative example of FIG. 9.
Figure 12A:
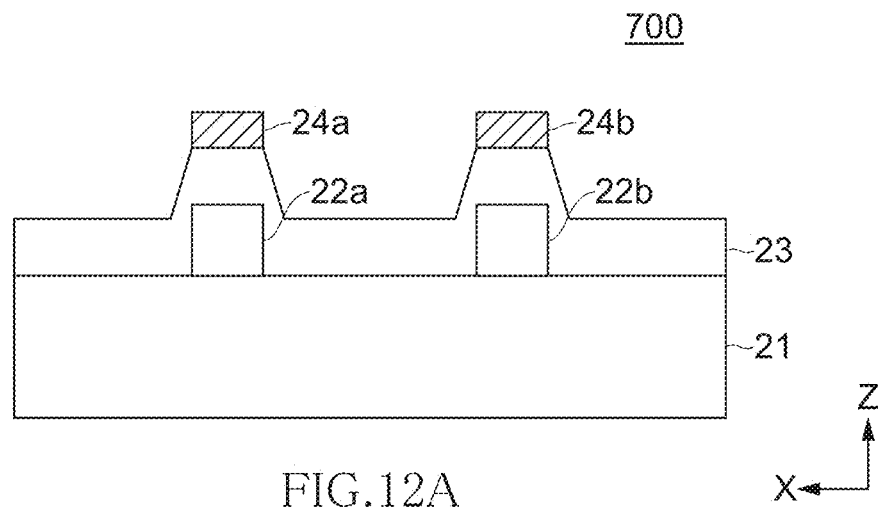
FIGS. 12A and 12B are schematic cross-sectional views each illustrating the structure of a conventional optical modulator.
Figure 12B:
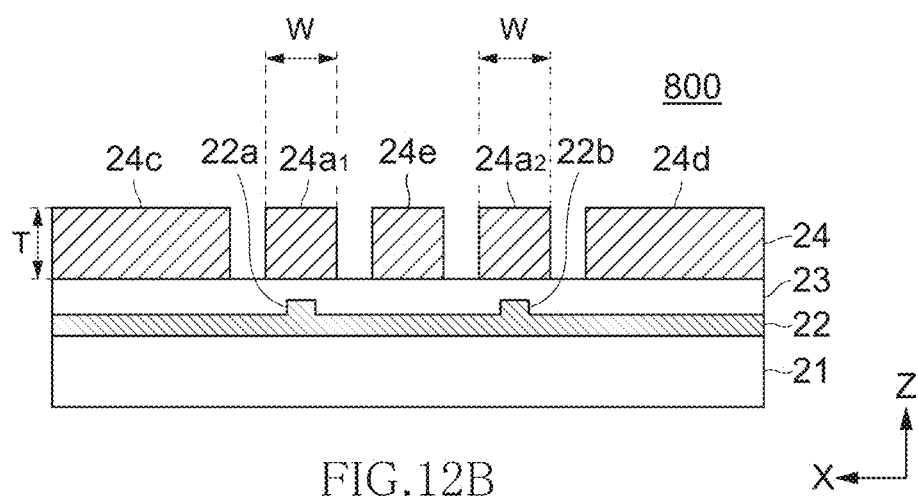

On the other hand, FIG. 11 illustrates the simulation result of the effective refractive index N$_m$ of a microwave when the thickness T of each of the electrodes 7$a$, 7$b$, 8$a$ and 8$b$ is changed in the comparative example of FIG. 9. As can be seen from FIG. 11, when the thickness T of each of the electrodes 7$a$, 7$b$, 8$a$ and 8$b$ is increased, the effective refractive index N$_m$ falls abruptly and differs significantly from the effective refractive index (2.05) of light, thus failing to satisfy the velocity matching condition.

To increase the $W_7$ and to increase the T in the comparative example bring about the same effect in terms of a reduction in electrode loss. However, the effective refractive index of a microwave little changes even when the $W_7$ of the example is increased, satisfying the velocity matching condition, whereas it significantly falls when the T in the comparative example is increased, failing to satisfy the velocity matching condition. Thus, it can be seen that the structure of the example is superior.

Thus, with the signal electrode having a two-layer structure according to the present invention, both improvement (reduction in the $V\pi L$) in the electric field efficiency and reduction in electrode loss can be achieved, providing advantage for a wider band of optical fiber communication and low voltage operation.

REFERENCE SIGNS LIST

1: Substrate
2: Waveguide layer
2r: Ridge part
3: Protective layer
4: Buffer layer
5: Insulating layer
6: Electrode layer
6i: Electrode isolation area
7a: First signal electrode
$7a_1$: One end of first signal electrode
$7a_2$: Other end of first signal electrode
$7a_H$: Upper layer part of first signal electrode
$7a_L$: Lower layer part of first signal electrode
7b: Second signal electrode
$7b_1$: One end of second signal electrode
$7b_2$: Other end of second signal electrode
$7b_H$: Upper layer part of second signal electrode
$7b_L$: Lower layer part of second signal electrode
8a: First ground electrode
8b: Second ground electrode
9a: First bias electrode
9b: Second bias electrode
10: Mach-Zehnder optical waveguide
10a: First optical waveguide
10b: Second optical waveguide
10c: Branch part
10d: Multiplexing part
$10e_1$: First linear section of Mach-Zehnder optical waveguide
$10e_2$: Second linear section of Mach-Zehnder optical waveguide
$10e_3$: Third linear section of Mach-Zehnder optical waveguide
$10f_1$: First curved section of Mach-Zehnder optical waveguide
$10f_2$: Second curved section of Mach-Zehnder optical waveguide
10i: Input optical waveguide
10o: Output optical waveguide
12: Terminal resistor
21: Sapphire substrate
22a: First optical waveguide
22b: Second optical waveguide
23: Buffer layer
24a, $24a_1$, $24a_2$: Signal electrode
24b, 24c, 24d, 24e: Ground electrode
100, 200, 300, 400, 500, 600, 700, 800: Optical modulator $G_0$: Gap between first and second signal electrodes
$G_{0H}$: Gap between first upper layer part and second upper layer part
$G_{0L}$: Gap between first lower layer part and second lower layer part
$G_{1a}$: Gap between first signal electrode and first ground electrode
$G_{1b}$: Gap between second signal electrode and second ground electrode
$S_{aH}$: Lower surface of first upper layer part
$S_{aL}$: Lower surface of first lower layer part
$S_{bH}$: Lower surface of second upper layer part
$S_{bL}$: Lower surface of second lower layer part
Si: Input light
So: Modulated light
$W_0$: Widths (ridge widths) of first and second optical waveguides
$W_{7a}$: Width of first upper layer part (maximum width of first signal electrode)
$W_{7a}$: Width (maximum width) of first upper layer part
$W_{7b}$: Width of second upper layer part (maximum width of second signal electrode)
$W_{7b}$: Width (maximum width) of second upper layer part
$W_{8a}$: Width of first ground electrode
$W_{8b}$: Width of second ground electrode
$W_{aH}$: Width of lower surface of first upper layer part
$W_{aL}$: Width of lower surface of first lower layer part
$W_{bH}$: Width of lower surface of second upper layer part
$W_{bL}$: Width of lower surface of second lower layer part
$Z_0$: Symmetric axis

What is claimed is:

1. An optical modulator comprising:
a substrate;
first and second optical waveguides formed of an electro-optic material film on the substrate so as to have a ridge shape and to be disposed adjacent to each other;
a buffer layer covering at least upper surfaces of the first and second optical waveguides;
first and second signal electrodes provided above the buffer layer; and
a protective layer formed on a waveguide layer including the first and second optical waveguides,
wherein the protective layer covers both side surfaces of each of the first and second optical waveguides, and the buffer layer is formed on the protective layer,
wherein the first signal electrode has a first lower layer part opposite to the first optical waveguide through the buffer layer and a first upper layer part provided above the first lower layer part,
wherein the second signal electrode has a second lower layer part opposite to the second optical waveguide through the buffer layer and a second upper layer part provided above the second lower layer part, and
wherein a width of each of lower surfaces of the first and second lower layer parts is smaller than a width of each of the first and second upper layer parts.

2. The optical modulator as claimed in claim 1 further comprising an insulating layer formed on the buffer layer and an electrode layer including the first and second upper layer parts and formed on the insulating layer, wherein the first and second lower layer parts are each embedded in openings formed in the insulating layer.

3. The optical modulator as claimed in claim 2, wherein the electrode layer further includes first and second ground electrodes provided so as to sandwich the first and second signal electrodes in a plan view.

4. The optical modulator as claimed in claim 3, wherein, at least a part of the insulating layer existing at a lower portion of an electrode isolation area between the first and second signal electrodes is removed.

5. The optical modulator as claimed in claim 1, herein a gap between the first and second upper layer parts is equal to or larger than a gap between the first and second lower layer parts.

6. The optical modulator as claimed in claim 1, wherein a cross-section structure of the first and second optical waveguides and the first and second signal electrodes is left-right symmetric in position.

7. The optical modulator as claimed in claim 1, wherein the width of each of the lower surfaces of the first and second lower layer parts is larger than the width of each of the first and second optical waveguides.

8. The optical modulator as claimed in claim 1, wherein
each of the first and second optical waveguides has at least one linear section and at least one curved section,
the first lower layer part is opposed to the linear section of the first optical waveguide through the buffer layer, and
the second lower layer part is opposed to the linear section of the second optical waveguide through the buffer layer.

9. The optical modulator as claimed in claim 1, wherein
the substrate is a single crystal substrate,
the electro-optic material film is a lithium niobate film, and
a c-axis of the lithium niobate film is oriented perpendicular to a main surface of the substrate.

* * * * *